(12) United States Patent  
Lin

(10) Patent No.: US 6,456,581 B1  
(45) Date of Patent: Sep. 24, 2002

(54) DISK PLAYER OF SIMPLIFIED HEAT-DISSIPATING STRUCTURE

(75) Inventor: Chi-Cheng Lin, Taoyuan (TW)

(73) Assignee: Acer Communications and Multimedia, Inc., Taoyuan (TW)

( * ) Notice: Subject to any disclaimer, the term of this patent is extended or adjusted under 35 U.S.C. 154(b) by 140 days.

(21) Appl. No.: 09/617,321

(22) Filed: Jul. 17, 2000

(30) Foreign Application Priority Data

Jan. 7, 2000 (TW) ...................................... 089100194 A

(51) Int. Cl.[7] ........................... G11B 33/14; G11B 25/04
(52) U.S. Cl. .................................... 369/75.1; 360/97.02
(58) Field of Search ......................... 369/30.63, 31.01, 369/75.1, 77.1, 258, 263, 264, 270, 75.2; 360/99.09, 97.02, 97.03, 97.04; 361/685, 687, 688, 689, 690, 694, 695, 696, 697

(56) References Cited

U.S. PATENT DOCUMENTS

| | | | |
|---|---|---|---|
| 4,054,931 A | * 10/1977 | Bolton et al. ............ | 360/97.03 |
| 5,737,304 A | * 4/1998 | Soga et al. ............... | 360/97.02 |
| 5,793,740 A | * 8/1998 | Nguyen ..................... | 360/99.12 |

FOREIGN PATENT DOCUMENTS

| | | | |
|---|---|---|---|
| JP | 5-258551 | * | 10/1993 |
| JP | 8-279242 | * | 10/1996 |
| JP | 9-44987 | * | 2/1997 |
| JP | 10-172277 | * | 6/1998 |
| JP | 10-269746 | * | 10/1998 |
| JP | 11-110959 | * | 4/1999 |
| JP | 11-126472 | * | 5/1999 |

* cited by examiner

Primary Examiner—David L. Ometz  
(74) Attorney, Agent, or Firm—Ladas & Parry

(57) ABSTRACT

A disk player of simplified heat-dissipating structure includes a housing, a platform and fan blades. The housing has a supporting portion. The fan blades are laid on the supporting portion of the housing. The platform is movably and rotatably provided in the housing. In operation, the platform is moved to elevate the fan blades from the supporting portion and then rotated to drive the fan blades to also rotate.

5 Claims, 2 Drawing Sheets

DISK PLAYER OF SIMPLIFIED HEAT-DISSIPATING STRUCTURE

BACKGROUND OF THE INVENTION

1. Field of the Invention

The present invention relates in general to a disk player of simplified heat-dissipating structure.

2. Description of the Related Art

FIG. 1 depicts a conventional disk player 10 for CDs, VCDs and DVDs, in which a plurality of ventilating holes 101 are provided on the front panel of the disk player 10 while a fan 103 (including fan blades and a fan motor) is provided at the back. The fan 103 operates to ventilate the side of the disk player 10 through the holes 101.

In conclusion, the conventional disk player is cooled down by the fan 103. However, it is understood that the fan motor is the most expensive part of the fan 103. An object of the present invention is to ventilate a disk player without the use of an expensive fan motor.

SUMMARY OF THE INVENTION

An object of the present invention is to reduce the production cost of a disk player.

In accordance with the object of the present invention, a disk player of simplified heat-dissipating structure is provided that includes a housing, a platform and fan blades. The housing has a supporting portion. The fan blades are laid on the supporting portion of the housing. The platform is movably and rotatably provided in the housing. In operation, the platform is moved to elevate the fan blades from the supporting portion and then rotated to drive the fan blades to also rotate.

It is understood that the disk player of the present invention is ventilated without the use of the expensive fan motor, thus reducing the production cost of the disk player.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
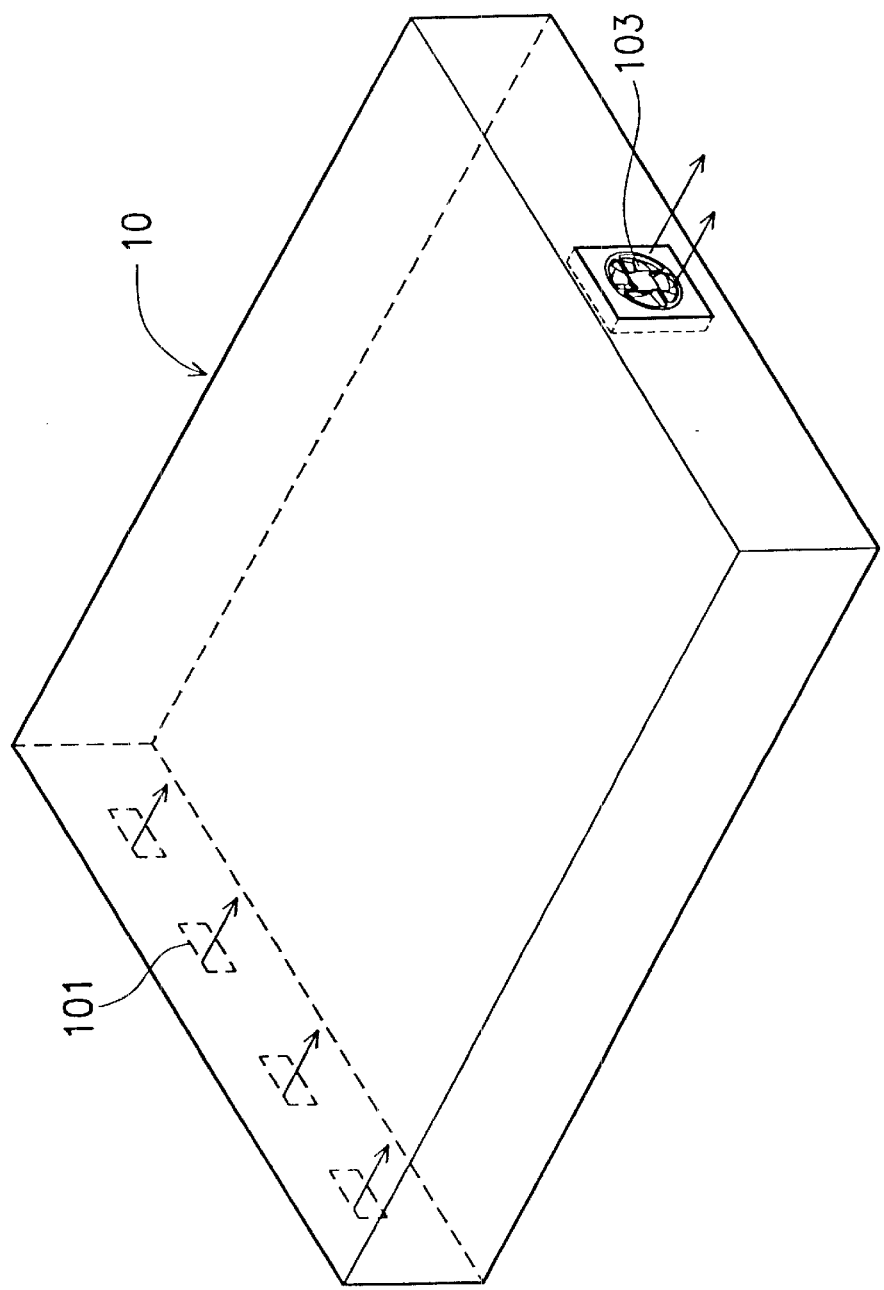
FIG. 1 depicts the heat-dissipating structure of a conventional disk player.
Figure 2:
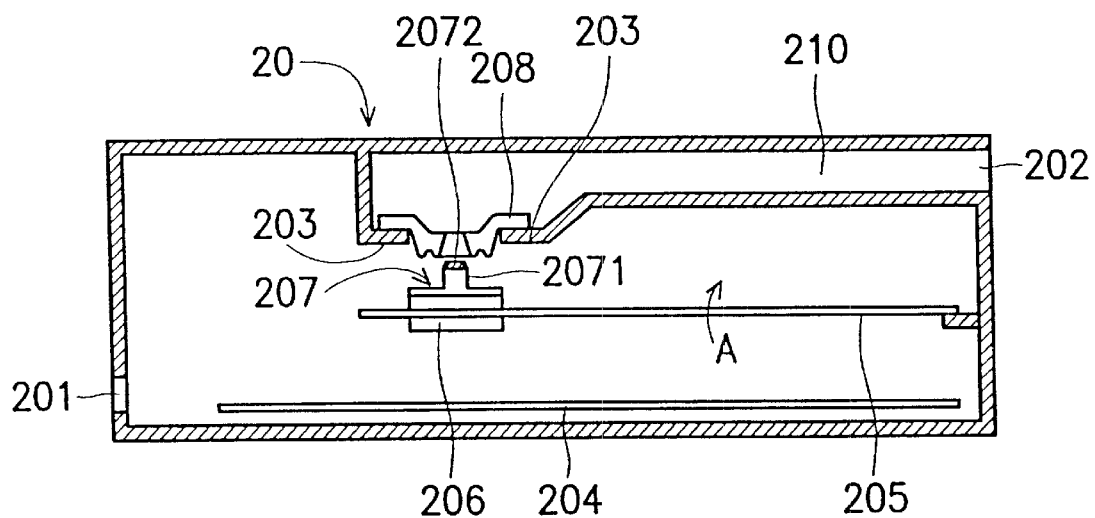
FIG. 2 depicts the heat-dissipating structure of a disk player of the present invention.

Referring to FIG. 2, a disk player 20 of the present invention has a housing. An air inlet 201 is provided on the housing while a passage 210 is formed in the housing. A supporting portion 203 is formed at an end of the passage 210 for supporting fan blades 208, while an air outlet 202 is formed at the other end of the passage 210 to communicate the outside of the disk player. It is noted that the fan blades 208 are not connected to the supporting portion 203. Instead, the fan blades 208 are laid on the supporting portion 203. A rotatable platform 207 is provided under the fan blades 208. The rotatable platform 207 has an upward protrusion 2071 and a magnet 2072 on the top of the protrusion 2071. The top of the protrusion 2071 is tapered. Furthermore, the rotatable platform 207 is firmly connected to a rotatable plate 205 via a spindle motor 206. The rotatable plate 205 is connected to the housing via its edge to rotate in direction A. A circuit board 204 provided under the rotatable plate 205 is the main heat source inside the disk player.

Figure 3:
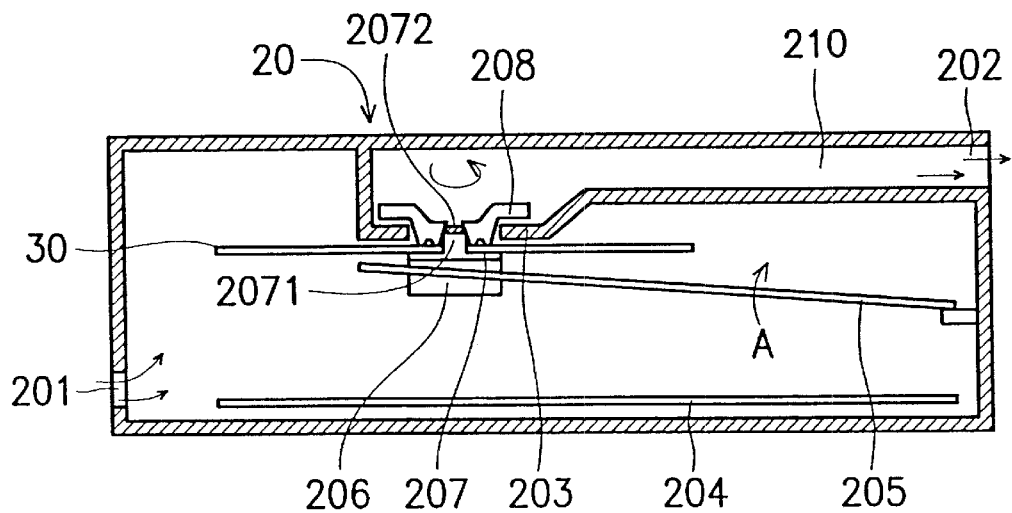
FIG. 3 depicts the operation of the heat-dissipating structure of the disk player of the present invention.

In operation, the user lays a disk (CD, VCD or DVD) on the tray of the disk player. As shown in FIG. 3, the tray (not shown) is moved back into the disk player while the plate 205 is rotated in direction A to elevate the platform 207 (U.S. Pat. No. 5,737,304). The fan blades 208 are circumferentially arranged with a central hole formed therebetween. The tapered top of the protrusion 2071 facilitates the protrusion 2071 to enter the central holes of the disk 30 and fan blades 208 to elevate the fan blades 208 from the supporting portion 203. The fan blades 208 are made of metal so that the magnet 2072 of the platform 207 can attract the fan blades 208 to clamp the disk 30 with the platform and the fan blades. In reading/writing operation, the spindle motor 206 rotates the platform 207, and the platform 207 rotates the fan blades 208 by the magnetic force as well as the disk 30 by the frictional force. The fan blades 208 are rotated to generate airflow so that outside cold air is sucked into the disk player through the air inlet 201. In addition, hot air in the disk player is exhausted through the passage 210 and the air outlet 202, thereby dissipating heat generated by the circuit board 204.

In conclusion, the present invention omits the expensive fan motor and only utilizes the inexpensive fan blades. The fan blades are driven by an existing device, for instance, a spindle motor, to ventilate the inside of the disk player. Thus, the production cost of the disk player of the present invention is greatly reduced.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A disk player including:
    a housing having a supporting portion inside;
    at least one fan blade laid on the supporting portion; and
    a platform movably and rotatably provided in the housing, wherein the platform is moved to elevate the at least one fan blade from the supporting portion and then rotated to drive the at least one fan blade to also rotate.

2. A disk player as claimed in claim 1, wherein the at least one fan blade is made of metal, and the platform has a magnet to attract the at least one fan blade and rotate the at least one fan blade by way of a magnetic force.

3. A disk player as claimed in claim 1, wherein the disk player includes a plurality of fan blades, the plurality of fan blades are circumferentially arranged with a hole formed therebetween, the platform further has a protrusion, and the protrusion enters the hole when the platform elevates the plurality of fan blades.

4. A disk player as claimed in claim 3, wherein the protrusion is tapered.

5. A disk player as claimed in claim 1, further including a spindle motor connected to the platform to rotate the platform.

* * * * *